United States Patent [19]
Bice et al.

[11] 3,762,208
[45] Oct. 2, 1973

[54] DIFFERENTIAL PRESSURE TRANSDUCER

[75] Inventors: James W. Bice, Wayne, N.J.; Will Timm, deceased, late of Flintridge, Calif. by Asta Timm, executrix

[73] Assignee: Celesco Industries, Inc., Costa Mesa, Calif.

[22] Filed: Nov. 11, 1971

[21] Appl. No.: 197,878

[52] U.S. Cl. .................. 73/398 AR, 338/4, 338/42
[51] Int. Cl. ............................................. G01l 9/04
[58] Field of Search .......... 73/398 AR, 406, 407 R; 338/4, 42

[56] References Cited
UNITED STATES PATENTS

| | | | |
|---|---|---|---|
| 3,035,240 | 5/1962 | Starr | 338/4 |
| 3,315,201 | 4/1962 | Werme | 338/42 |

Primary Examiner—Donald O. Woodiel
Attorney—Tipton D. Jennings

[57] ABSTRACT

A housing structure defines opposing sealed fluid pressure chambers separated by a thin flexible metal diaphragm formed integrally with a surrounding retaining ring and a narrow thickened beam portion extending radially across the diaphragm. A small cavity is formed extending into one end of the beam portion. Strain gages, electrically coupled as a differential bridge circuit, are applied to opposite walls of the cavity in the area of maximum bending stress to measure the compresson strain on one wall and the tension on the other resulting from deflection of the diaphragm and its beam portion by pressure differences in the opposing chambers.

10 Claims, 5 Drawing Figures

PATENTED OCT 2 1973 3,762,208

DIFFERENTIAL PRESSURE TRANSDUCER

BACKGROUND OF THE INVENTION

This invention relates to transducers and, more particularly, to strain gage differential pressure transducers adapted to detect differences in pressure forces applied to opposite sides of a diaphragm structure.

Transducers of this type are often required to monitor pressure differentials in a fluid medium that might damage or destroy the sensing elements employed. For example, pressure differences between two points in a process stream carrying corrosive chemicals may be monitored. In the past, transducers employing two diaphrams have been required to isolate the sensing elements from such damaging mediums. In such transducers, a layer or fill of oil may be provided between the two diaphragms with the sensing elements mounted on the inner surface of one diaphragm within the oil fill so that the corrosive chemicals may then impinge against the outer sides of the two diaphragms without damaging the sensing elements.

However, errors are introduced in such systems because static line pressures tending to compress the diaphragms and the enclosed oil fill decrease transducer sensitivity and accuracy. Furthermore, as temperature decreases, the oil may become more viscous, thus slowing the transducer response time at low temperatures.

The present invention overcomes the difficulties of these prior transducers while at the same time being less expensive to manufacture.

SUMMARY OF THE INVENTION

A transducer housing structure provides two mutually isolated fluid pressure chambers separated by a unitary flexible diaphragm structure containing a small cavity into the flexible structure. Sensing means are mounted on interior surfaces of the cavity where substantial bending occurs to detect and measure deflections of the structure. The sensing means are sealed from the two chambers so that opposite sides of the flexible diaphragm are exposed to the fluid pressure medium without contacting or damaging the sensing means.

In the preferred embodiment, the housing structure has two end plate members held in place on opposite sides of an outer retaining ring. The flexible diaphragm structure has a thin circular metal diaphragm formed with a cylindrical diaphragm support ring around its periphery and with a narrow thickened beam portion extending radially across the diaphragm. The diaphragm, beam portion and support ring are formed as one integral unit. Both end plates have inner surfaces formed to match the contour of the adjacent surfaces of the flexible diaphragm and beam. These inner end plate surfaces are positioned in close proximity to the flexible member to serve as mechanical stops on both sides of the flexible member limiting the maximum deflection which could otherwise result in permanent deformation or destruction of the flexible diaphragm. The outer retaining ring is held rigidly in place between the two end plates with a pressure seal at each end. Each end plate has a central inlet opening for conducting the fluid medium into the fluid pressure chamber formed between its inner surface and the adjacent surface of the diaphragm. The cavity is drilled in the retaining ring to extend into one end of the beam, and strain gage sensing elements are secured to opposite interior walls of the cavity. When the diaphragm and beam are deflected by a differential pressure, these interior cavity walls, along with the attached strain gages are placed in tension or compression, according to the direction and amplitude of the diaphragm deflection.

In certain applications, holes are provided in the cylindrical walls of the diaphragm support ring so that its outer wall surfaces are subjected to the same pressure as one of the chambers. One end of the diaphragm ring is sealed against its end plate to isolate the other chamber. The pressure on the outside of the retaining ring counters that on the inside of the diaphragm ring which with high static line pressures tends to be forced outwardly, thus stretching the diaphragm and rendering it less sensitive to small pressure differences.

BRIEF DESCRIPTION OF THE DRAWING

Other advantages and features of the invention will be understood from the detailed description taken in conjunction with the figures of the drawing wherein.

DETAILED DESCRIPTION OF THE INVENTION

Figure 1:
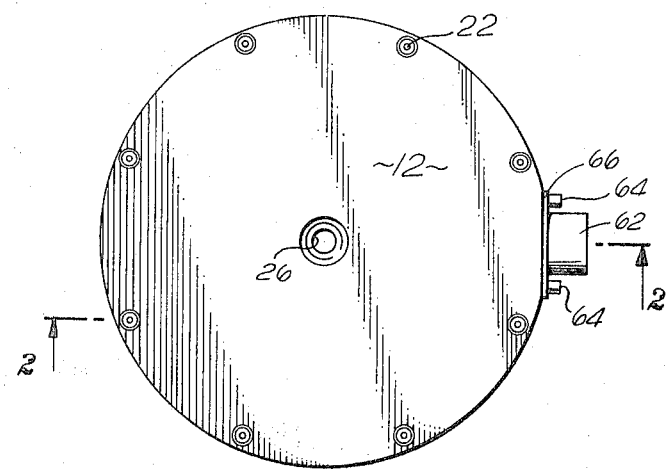
FIG. 1 is a plan view of one embodiment of the invention.
Figure 2:
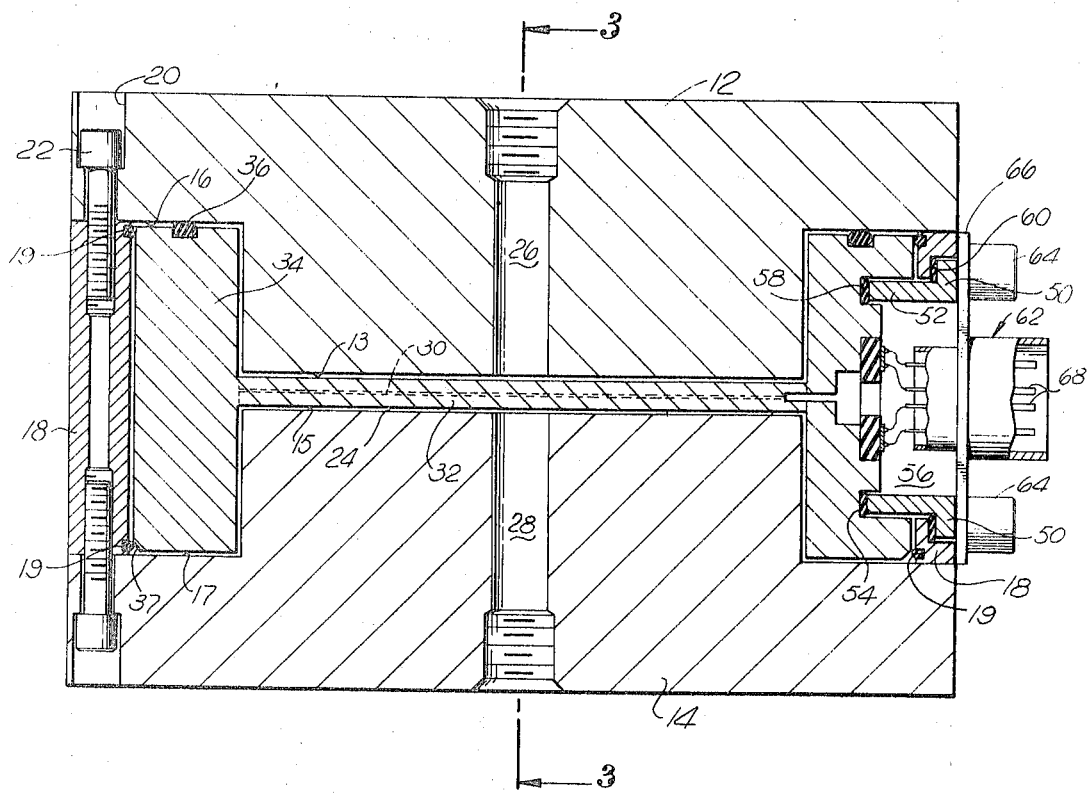
FIG. 2 is a cross-sectional elevational view taken along the line 2—2 of FIG. 1.

In a preferred embodiment of the invention, as shown in FIGS. 1 and 2, the transducer housing has two cylindrical end plates 12 and 14 both having inner cylindrical end portions providing substantially flat circular interior surfaces 13 and 15 respectively. Each end plate also has an integral larger diameter outer flange portion defining opposed flat annular inner surfaces 16 and 17 around the periphery of the two end plates. An outer retaining ring 18, formed as a thick walled hollow cylinder, has its flat annular end surfaces clamped tightly between the surfaces 16 and 17 when the two end plates 12 and 14 are secured together. Outer retaining ring 18 acts to space apart the inner adjacent surfaces 13 and 15 of the end plates 12 and 14 by a precise amount to provide clearance for the diaphragm 30.

Threaded counter sunk holes 20 in the retaining ring 18 and the outer flange portions of end plates 12 and 14 are aligned to receive screws 22 which are tightened to securely hold the end plates 12 and 14 tightly against the retaining ring 18 and at the same time to provide a precise gap 24 between the inner surfaces 13 and 15 sufficient to receive the diaphragm 30. Of course, other methods such as welding may be employed to secure the end plates, the retaining ring, and the diaphragm ring 36 together. The outer retaining ring 18 has hard rubber 0-rings 19 positioned in its notched interior edges to seal against the adjacent surfaces 16 and 17 of the end plates 12 and 14 respectively to prevent loss of pressure and fluid from the housing.

Cylindrical bores or chambers 26 and 28 extend through the central portion of the end plates 12 and 14 respectively and are threaded at their outer ends for connection to two pressure lines from the points between which pressure differences are being monitored.

As has been described above, the end plate inner surfaces 13 and 15 are separated by a cylindrical gap 24 provided by the outer retaining ring 18 spacing apart the two end plates 12 and 14. The gap 24 has an enlarged portion extending from one side of the gap 24 to the other in order to provide clearance for the beam 32, to be described hereinafter. The two end plates and the retaining ring 18 together enclose a diaphragm subassembly that is mounted within the retaining ring 18 between the end plates.

As may be seen in FIGS. 2 through 5, the diaphragm subassembly comprises a thin flexible circular diaphragm 30, an integral narrow thickened beam portion 32 extending diametrically across both sides of the diaphragm 30, and an integral annular diaphragm support ring 34 extending around the outside periphery of the diaphragm 30.

The diaphragm 30 and beam 32 are formed equidistant between the ends of the diaphragm ring 34 and after assembly are positioned about midway between the inner surfaces 13 and 15 of the end plates 12 and 14 in gap 24 and in close enough proximity to the walls 13 and 15 so that the walls serve as overload stops to prevent permanent deformation or destruction of the diaphragm due to excessive pressure differentials applied to the diaphragm 30 through the chambers 26 and 28.

The diaphragm subassembly is preferably formed from a single piece of metal, and preferably from high grade stainless steel such as 17–4 PH stainless steel. The diaphragm subassembly is precisely machined by electronic discharge machining.

Figure 3:
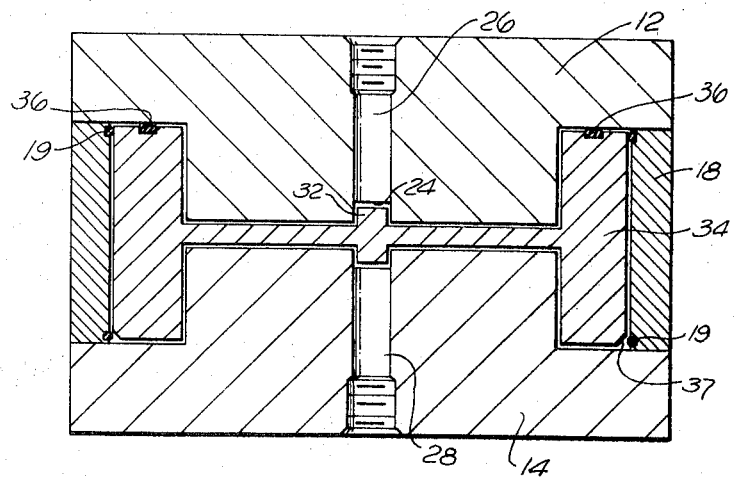
FIG. 3 is a cross-sectional elevational view taken along line 3—3 of FIG. 2.

The diaphragm ring 34 fits snuggly between the flat inner surfaces 16 and 17 inside the retaining ring 18. A hard rubber O-ring 36 retained in a circular groove around one end of the diaphragm ring 34 provides a seal between the pressure chambers. The lower outer edge of the diaphragm ring 34 is cambered, as at 37, in order to prevent the lower O-ring 19 from forming a seal at that point. Preferably, the O-ring 36 seal is placed at the end of the diaphragm ring 34 that receives the lower static line pressure, with no seal at the high pressure end. As shown in FIGS. 2 and 3, the O-ring 36 is positioned between the diaphragm ring 34 and the end plate surface 16, thus making the upper end the low pressure side. Alternatively, the seal could be made on the high pressure side, and the camber 37 in that case could be provided at the upper outer edge of the diaphragm ring 34.

Figure 5:
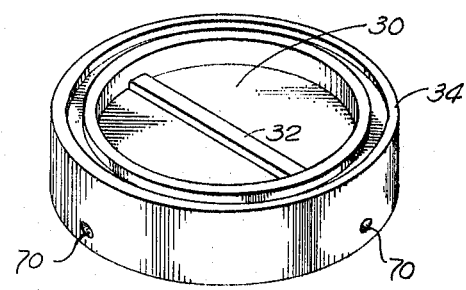
FIG. 5 is a perspective view of a second embodiment of the invention.

The axial length of the diaphragm ring 34 is preferably slightly less than the axial length of the retaining ring 18 so that the O-ring 36 seals the low pressure end of the diaphragm ring 34 without exerting enough pressure to seal the high pressure end. This permits some leakage between the surface 17 and the diaphragm ring 34. Alternatively, grooves or holes 70 may be drilled through the lower end of the periphery of the diaphragm ring 34, as shown in FIG. 5, in order to facilitate fluid pressure communication between the interior and exterior of the diaphragm support ring 34.

A seal is thus provided between the chambers 26 and 28 while at the same time the fluid pressure in the chamber 28 is allowed to pass beneath the diaphragm ring 34 and to communicate with the outside of the diaphragm ring between the outer retaining ring 18 and the diaphragm ring 34. In this manner, pressure is applied to both the inside and the outside of the diaphragm ring 34 to equalize the pressures applied to the inside of the diaphragm ring 34 which would otherwise stretch the diaphragm 30. If high pressure were applied to only the inside of the diaphragm ring 34, the diaphragm 30 would be placed under considerable tension and the amount of pressure required to deflect the diaphragm 30 would be increased. This would result in slight changes in pressure going unnoticed or being erroneously detected. Therefore, the fluid pressure is allowed to pass beneath the diaphragm ring 34 between the diaphragm ring 34 and the lower end plate 14 so that the outside of the diaphragm ring 34 will eventually be at the same high pressure as the chamber 28. Of course, a certain amount of pressure is required in chamber 28 in order to force fluid between the lower end of the diaphragm ring 34 and the end plate 14. However, the height of the diaphragm ring 34 is such that pressures which are incapable of forcing fluid to the outside of the ring 34 will not be high enough to stretch the diaphragm 30 by an amount sufficient to cause erroneous readings.

In another embodiment of the invention (not shown), a second O-ring is provided at the bottom of diaphragm ring 36 and the retaining ring 18 and the diaphragm ring 34 are secured tightly together to prevent the passage of fluid to the outside of the diaphragm ring 34. This embodiment of the invention is particularly useful where large changes in pressure are anticipated compared with the normal line pressure and therefore any stretching of the diaphragm 30 due to the normal line pressure will be negligible compared with the high pressure changes to be detected.

In one example of employing the diaphragm subassembly, a high normal or static line pressure of about 5,000 psi is to be applied to both chambers 26 and 28. If the expected maximum differential in the line pressure to be measured is only of the order of about 25 psi, the diaphragm 30 and beam 32 might have a diameter of 1½ inches and would be deflected only about 0.0015 inches at the center when subjected to such pressure differentials.

Where higher pressure differentials are expected so that sensitivity to small pressure differentials is not important, the entire diaphragm 30 is thickened (not shown) to equal the thickness of the beam 32 so that the beam 32 is, in effect, eliminated. In that case, of course, the gap 24 between the end plate surfaces 13 and 15 is widened to compensate for the increased thickness of the diaphragm 30.

The diaphragm beam 32 is needed only to provide an enlarged portion at the periphery of the diaphragm 30 for the small cavity 38 which is drilled in one end of the beam 32 for the reception of strain sensitive elements. The cavity 38, which communicates with the larger space 56 formed partly in the diaphragm ring 34 and partly in the retaining ring 18, extends into the interior of the diaphragm 30 and has top and bottom walls parallel to the plane of the diaphragm.

Figure 4:
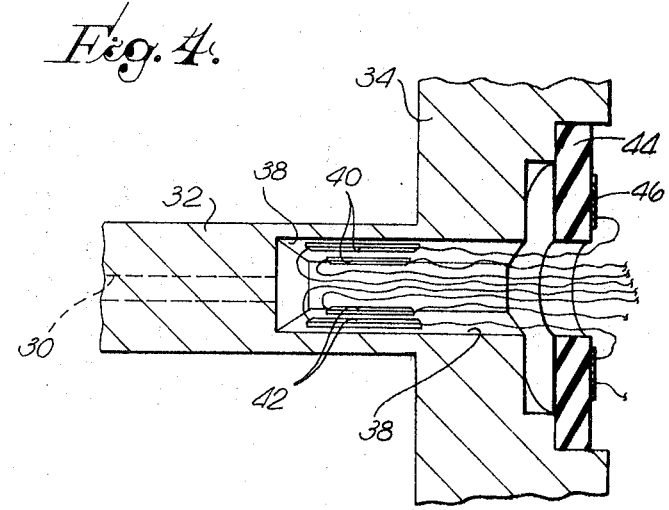
FIG. 4 is an enlarged cross-sectional perspective view of a portion of the embodiment shown in FIG. 2.

As may best be seen in FIG. 4, two semiconductor strain gages 40 are mounted on the top wall of the cavity 38 and two semiconductor strain gages 42 are mounted on the bottom wall of the cavity 38 with a suitable adhesive. The strain gages are mounted within the outer limits of the diaphragm 30 near to the intersection of the diaphragm 30 and diaphragm ring 34 in order to take advantage of the high stress concentrations which occur in that region when the diaphragm 30 is deflected. A flat annular terminal ring 44 is mounted on the outside of the cavity 38 with a suitable adhesive. The terminal ring 44 is composed of an electrical insulating material, such as epoxy board or plastic.

The leads of the strain gage elements 40 and 42 pass through the central opening in the terminal ring 44 and are electrically connected, by soldering or the like, to metal terminal pads 46. Terminal pads 46, composed of copper or the like, are mounted on terminal ring 44 with a suitable adhesive.

An annular metal sleeve 50 is fitted into an opening 46 in one side of the retaining ring 18. A tongue 52 of the sleeve 50 fits into a corresponding annular groove 54 in the diaphragm ring 34. A hard rubber 0-ring 58 is positioned between the end of the tongue 52 and the diaphragm ring 34. A second hard rubber 0-ring 60 is positioned between sleeve 50 and retaining ring 18. The sleeve 50 is slightly wider than the distance between the end of the groove 54 and the outside walls of the end plates so that when connector 62 is bolted into place to close the opening 56, the sleeve 50 is forced inwardly against the 0-rings 58 and 60. The 0-rings 58 and 60 are thus squeezed between the sleeve 50 and a diaphragm ring 34 and between the sleeve 50 and the retaining ring 18, thus isolating the semiconductor strain gages and their leads from harmful chemicals and the like. 0-ring 60 also prevents the escape of fluids from the housing between the retaining ring 18 and the sleeve 50.

Electrical connector socket 62 is mounted on one side of end plates 12 and 14 by means of screws 64 securing the square flange 66 of the connector 62 to the side wall of the outer retaining ring 18 around the outside of the space 56. Electrical connector 62 provides a cover for the space 56 thus sealing the space 56 and the cavity 38 from the surrounding atmosphere. The terminals 46 are electrically connected to connector pins 68 to receive signals from the strain gages 40 and 42.

All of the parts shown in the drawings are composed of metal, such as stainless steel, except the semiconductor strain gages 40 and 42, the terminal ring 44, and the 0-rings 19, 36, 58 and 60.

In operation, when fluid pressures are applied to the chambers 26 or 28, the pressure in the chamber 26 will be applied across the entire top surface of the diaphragm 30 and the pressure in the chamber 28 will be applied across the entire lower surface of the diaphragm 30. If the pressure applied to chamber 26 is different from the pressure applied to chamber 28, the total force on one surface of the diaphragm 30 will exceed the force on the opposite surface, thus producing a net force on one surface of the diaphragm which will deflect the diaphragm in a given direction by an amount corresponding to the pressure differential between the two chambers. As the diaphragm 30 and beam 32 are deflected, bending of the diaphragm at its periphery places one of the upper or lower walls of the cavity 38 in tension and the other wall in compression. These stresses in opposite walls of the cavity 50 are detected by the strain gage elements 40 and 42.

For example, when greater pressure is applied to chamber 28 than to chamber 26, the diaphragm 30 deflects upwardly so that the strain gage elements on the lower wall of the cavity 40 are subjected to tension while the strain gage elements on the upper wall of the cavity are subjected to compression.

The leads of the strain gages are electrically interconnected to form a conventional bridge circuit (not shown) in which the strain gage elements 40 on the upper wall of the cavity constitute two opposite arms of the bridge, while the strain gage elements 42 on the bottom wall of the cavity constitute the two other opposite arms of the bridge. Typically, a constant voltage or current power supply (not shown) is connected across two first diagonally opposite input connection points of the bridge, with the output being obtained from the two other opposite connection points. Temperature compensating circuitry may be employed as needed, typically be connecting a temperature responsive resistance across the power supply connection points in the bridge. An output indicator, such as an oscilloscope, oscillograph, magnetic data recorder, chart recorder, or galvinometer receives the output to record or indicate the amplitude and variation of the pressure differential being monitored.

The invention has been described in preferred forms with particularity, but this is only by way of example. Various changes in construction and application may be made without departing from the spirit or scope of the invention.

The invention claimed is:

1. A differential pressure transducer, comprising:
   a housing having two fluid pressure chambers;
   a flexible diaphragm separating said chambers, said flexible diaphragm having opposed surfaces and an internal cavity extending radially inwardly from an edge thereof between opposite diaphragm surfaces;
   a diaphragm support ring formed integrally with the flexible diaphragm at its outer periphery, said diaphragm support ring having an inside surface and an outer surface, said chambers communicating with opposite surfaces of said flexible diaphragm and with the inside surface of said diaphragm support ring;
   means for supplying fluid pressure from one of said chambers to the outer surface of said diaphragm support ring; and
   strain sensing means mounted within said cavity in the plane of said flexible diaphragm for detecting bending stresses resulting from deflections of said flexible diaphragm by differences in the fluid pressures applied to said chambers.

2. A transducer as defined in claim 1 wherein said sensing means are strain gages mounted within said cavity near the outer periphery of said flexible diaphragm on at least one wall of said cavity parallel to the plane of said flexible member, and further comprising means for sealing said cavity from said fluid pressure chambers.

3. A transducer, comprising:
   a housing having two fluid pressure chambers;
   a flexible diaphragm separating said chambers, said diaphragm having opposed surfaces, one surface of said diaphragm communicating with one of said chambers and the opposite surface of said diaphragm communicating with the other chamber, and having a cavity formed between said surfaces to extend inwardly from one edge parallel to said surfaces;
   a pressure seal between said two chambers;

a support formed around the outer edges of said flexible diaphragm, said support having an inside and an outside, both of said chambers communicating with the inside of said support to minimize stretching of said flexible diaphragm; and a sensing element mounted within said cavity, said sensing element being mounted parallel to the plane of said flexible diaphragm and being adapted to detect deflections of said flexible diaphragm.

4. A transducer as defined in claim 3 wherein said flexible diaphragm is a thin metal diaphragm and said support means is an elongated cylindrical diaphragm support ring formed integrally with said diaphragm to surround its edges, said diaphragm support ring having two ends, and wherein said seal comprises an 0-ring between one end of said support ring and an interior surface of said housing.

and wherein said fluid pressure supplying means includes having the other end of said diaphragm ring not being sealed to permit fluid pressure in one of said chambers to be supplied to the outside of said diaphragm support ring.

5. A transducer as defined in claim 4 further comprising:

a narrow thickened beam portion formed integrally with said diaphragm and extending diametrically across said diaphragm, said cavity extending into one end of said beam.

6. A differential strain gage transducer, comprising:

a housing having first and second cylindrical end plates formed with opposing inner end surfaces, each having a central inlet bore extending axially therethrough;

an annular retaining ring secured between said end plates to space apart opposing inner end surfaces;

an integral diaphragm subassembly comprising a thin flexible diaphragm, an elongated diaphragm support ring fromed around the outer periphery of the diaphragm to support the edges and a narrow thickened beam portion extending diametrically across said diaphragm, said diaphragm being mounted between said two end plates and spaced from said opposing inner end surfaces, opposite surfaces of said diaphragm and the adjacent inside surfaces of said diaphragm ring being in fluid pressure communication with the respective inlet bores and the outside of said diaphragm ring being in communication with one of said bores;

said subassembly being formed with an opening in said diaphragm ring extending radially from its outer periphery and terminating in a small cavity extending radially into one end of said beam portion to define opposing walls in a plane parallel to the plane of the diaphragm and extending into said beam; and sensing elements secured to the top and bottom walls of said cavity adapted to detect deflections of said diaphragm due to differences in the pressures applied through said bores to said diaphragm.

7. A transducer as defined in claim 6 wherein the opposing inner end surfaces are formed on said end plates to match the contours of the adjacent surfaces of said diaphragm and beam portion and are closely spaced therefrom to act as mechanical stops for said diaphragm.

8. A differential strain gage pressure transducer, comprising:

a housing having first and second cylindrical end plates, said end plates each having a flat inner end surface positioned closely adjacent that of the other;

an outer retaining ring in the form of a thick walled cylindrical sleeve held between an outwardly flanged outer end portion of said two end plates maintaining a predetermined spacing between said adjacent flat inner end surfaces;

means for securing said two end plates and said retaining ring together to form a rigid unit;

said end plates each having a central fluid inlet bore extending axially from the inner to the outer ends of each end plate;

an integral metal diaphragm subassembly comprising a thin flat flexible circular diaphragm, a narrow thickened beam portion formed on both sides of said diaphragm and extending diametrically in the same direction across opposite surfaces of said diaphragm, and an elongated annular diaphragm support ring formed around the outer periphery of said diaphragm;

said diaphragm ring being clamped between said end plates so that the diaphragm is spaced substantially midway between said adjacent flat inner end surfaces of said end plates to define separate first and second fluid pressure chambers;

sealing means between at least one of said end plates and said diaphragm support ring for preventing fluid pressure communication between said first and second fluid pressure chambers;

said diaphragm support ring being formed to define radial openings communicating between only one of said chambers and the exterior surfaces of said diaphragm support ring;

a small hollow cavity extending radially into one end of said beam portion and communicating externally through enlarged radial apertures formed through the cylindrical walls of said diaphragm support ring and said outer retaining ring, said cavity providing opposite interior walls parallel to the plane of said diaphragm;

a first pair of semiconductor strain gage elements attached to one interior wall of said cavity;

a second pair of semiconductor strain gage elements attached to the opposite interior wall of said cavity;

said first and second pairs of semiconductor strain gage elements attached to said opposite interior walls being placed respectively in tension and in compression by bending resulting from deflections of said diaphragm and said beam portion by fluid pressure differences in said chambers; and circuit means coupling said first and second pair of strain gage elements, with said enlarged apertures being adapated to receive external input and output electrical connections thereto.

9. A transducer as defined in claim 2 wherein said fluid pressure supplying means comprises a plurality of holes extending through said diaphragm support ring.

10. A transducer as defined in claim 3 wherein said fluid pressure supplying means comprises a plurality of holes extending through said support.

* * * * *